(No Model.)
F. J. HOYT.
BICYCLE LOCK.
No. 560,355.      Patented May 19, 1896.
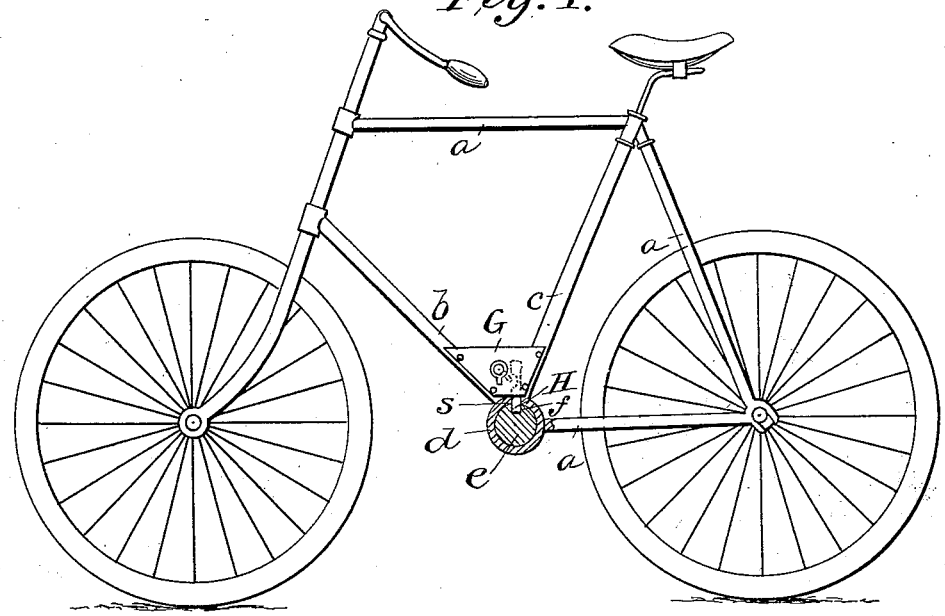
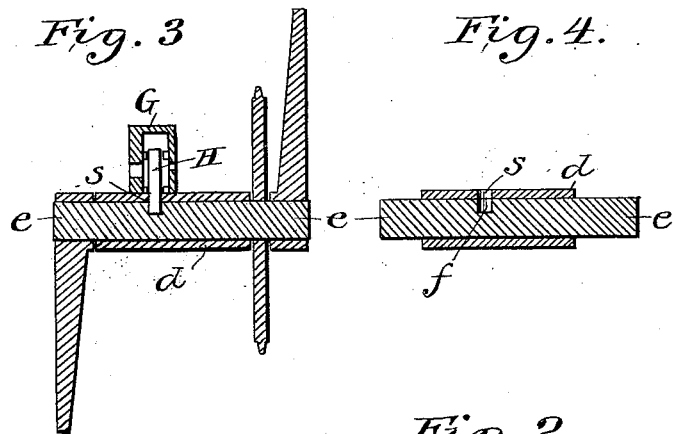
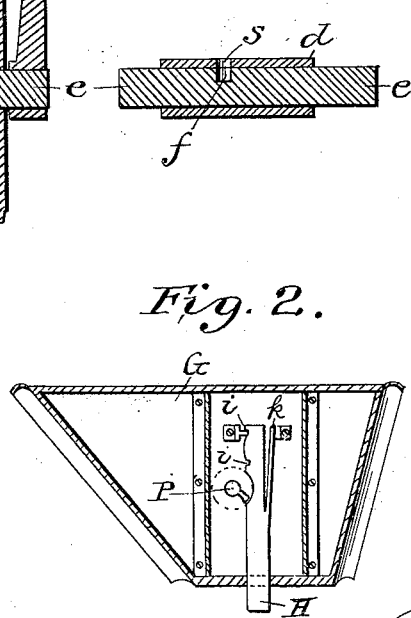
Witnesses
Jos H Blackwood
Albert B. Blackwood.
Inventor
Frederick J Hoyt
by W. H. Doolittle & Son
Attorneys

UNITED STATES PATENT OFFICE.

FREDERICK J. HOYT, OF CHICAGO, ILLINOIS, ASSIGNOR TO WILLIAM H. STERLING AND L. JUDSON WEST.

BICYCLE-LOCK.

SPECIFICATION forming part of Letters Patent No. 560,355, dated May 19, 1896.

Application filed August 17, 1895. Serial No. 559,619. (No model.)

*To all whom it may concern:*

Be it known that I, FREDERICK J. HOYT, a citizen of the United States, residing at Chicago, in the county of Cook and State of Illinois, have invented certain new and useful Improvements in Bicycle-Locks; and I do hereby declare the following to be a full, clear, and exact description of the invention, such as will enable others skilled in the art to which it appertains to make and use the same.

My invention relates to locks for bicycles and other similar vehicles; and its object is to improve that class of bicycles in which a locking device is employed to lock the wheels when the apparatus is not in use to prevent the same from being stolen or taken away by an unauthorized person.

To this end my invention consists in a bicycle provided with tubular arms, the combination therewith of the pedal-casing to which the lower converging ends of the arms are connected, a pedal-shaft having its bearings in said casing, a detachable locking-case located between and attached to the converging ends of the said arms and adapted to brace said arms, said locking-case provided with a bolt, and said pedal-casing and shaft each provided with an aperture to receive said bolt, and a suitable key, as hereinafter more particularly described and claimed. Thus I attain great simplicity in construction and operation and, as will be seen, also great efficiency.

My invention is illustrated in the accompanying drawings, in which—

Figure 1 is a side elevation of a bicycle of a well-known form, showing the front of the locking-case applied thereto and showing pedal-shaft in section; Fig. 2, a back view in detail of the locking-case and bolting parts; Fig. 3, a transverse section lengthwise of pedal-shaft, showing connection of locking-bolt therewith; Fig. 4, a detail longitudinal section of pedal-shaft and sleeve.

Referring to the drawings, *a a a b c* are the tubular parts of a bicycle-frame of a well-known form, and in which *b c* are the arms which carry or to which is attached a sleeve *d*, which forms a bearing for a pedal-shaft *e*.

In the form of frame shown I secure to the arms *b c*, just above the sleeve *d*, a case G, which carries a locking mechanism.

I have shown a simple well-known form of lock and key; but any desired form of lock and key may be employed that will force a bolt into a notch, slot, or hole in the pedal-shaft.

The form of locking mechanism shown attached to the case consists of a bolt H, notched at *i i* and provided with a back spring *k*.

P is the key. The pedal-shaft *e* is provided with a slot or mortise *f*, into which enters the bolt H when thrown by the key. The bolt when unlocked is held in the case above the sleeve *d*, and when thrown it passes through the hole *s* in the sleeve and enters the aperture *f* in the pedal-shaft.

The locking-case is provided with a suitable keyhole, and any form of key corresponding to the character of lock may be employed. The location of the locking-case as described renders the case a substantial brace for strengthening the converging ends of the tubular arms.

A further description of the operation of the device is not necessary, and the celerity by which a cycle may be locked and the convenience and advantages in the use of a key need not be further dwelt upon.

What I claim as my invention is—

In a bicycle provided with tubular arms, the combination therewith of the pedal-casing to which the lower converging ends of the arms are connected, a pedal-shaft having its bearings in said casing, a detachable locking-case located between and attached to the converging ends of the said arms and adapted to brace said arms, said locking-case provided with a bolt, and said pedal-casing and shaft each provided with an aperture to receive said bolt, and a suitable key, substantially as described.

In testimony whereof I affix my signature in presence of two witnesses.

FREDERICK J. HOYT.

Witnesses:
SARAH M. HOYT,
EDITH F. HOYT.